March 12, 1957  R. H. GRIERSON ET AL  2,784,525
DISPLAY APPARATUS
Filed Sept. 1, 1954  4 Sheets-Sheet 3

INVENTORS
RAYMOND H. GRIERSON
CALVIN B. HESS
BY Cushman, Darby & Cushman
ATTORNEYS

INVENTORS
RAYMOND H. GRIERSON
CALVIN B. HESS

BY Cushman, Darby & Cushman
ATTORNEYS

United States Patent Office 2,784,525
Patented Mar. 12, 1957

2,784,525

DISPLAY APPARATUS

Raymond H. Grierson and Calvin B. Hess, Lincoln, Nebr., assignors to Triad Manufacturing Company, Lincoln, Nebr., a corporation of Nebraska Application September 1, 1954, Serial No. 453,478

8 Claims. (Cl. 46—122)

This invention relates to apparatus for motivating display devices, mannequins, and the like.

More particularly, this invention relates to display apparatus in which a carriage is moved along an endless trackway and utilizes the relative motion between the carriage and the trackway to impart various motivations to display devices borne by the carriage.

Modern advertising and display techniques have made widespread use of animated or motivated display devices in which the objects being displayed are imparted one or more mechanically induced forms or types of movements to catch and hold the eye of the observer, that is, to draw attention to themselves. It is within the contemplation of this invention to provide display apparatus which may be moved along a track of any desired length, and which will also be provided with one or more shafts, or other members, which will rotate or oscillate in any desired or preconceived directions, either constantly or at selected intervals. The rotational movement of such shafts may be translated by ordinary mechanical gearing and linkage into any of an infinite variety of movements or animating motions in the display device.

It is therefore an object of this invention to provide an improved display apparatus which will impart one or more pre-selected motions, either independently or concurrently, to display devices.

It is a further object of this invention to provide a carriage which may be moved along a trackway and which will utilize the relative motion of the carriage and the trackway to provide one or more rotational or oscillating movements to one or more shafts carried thereon whereby display devices borne by the carriage may be imparted any of an infinite variety of motivations.

It is still a further object of this invention to provide means for moving a display device in a preconceived path.

It is another object of this invention to provide a base for supporting a moving display device, the base being made up of a plurality of interfitting sections which may be selectively rearranged to define any of an infinite variety of pathways for such movement.

These and other objects of our invention will be fully understood from the following detailed description of a typical preferred form and application of the invention, throughout which description reference is made to the accompanying drawings, in which:

Figure 5 is a fragmentary view taken along line 5—5 of Figure 3 to better illustrate the detent mechanism.

Figure 6 is a fragmentary view taken along line 6—6 of Figure 3, illustrating a second form of arm detent mechanism.

Figure 1:
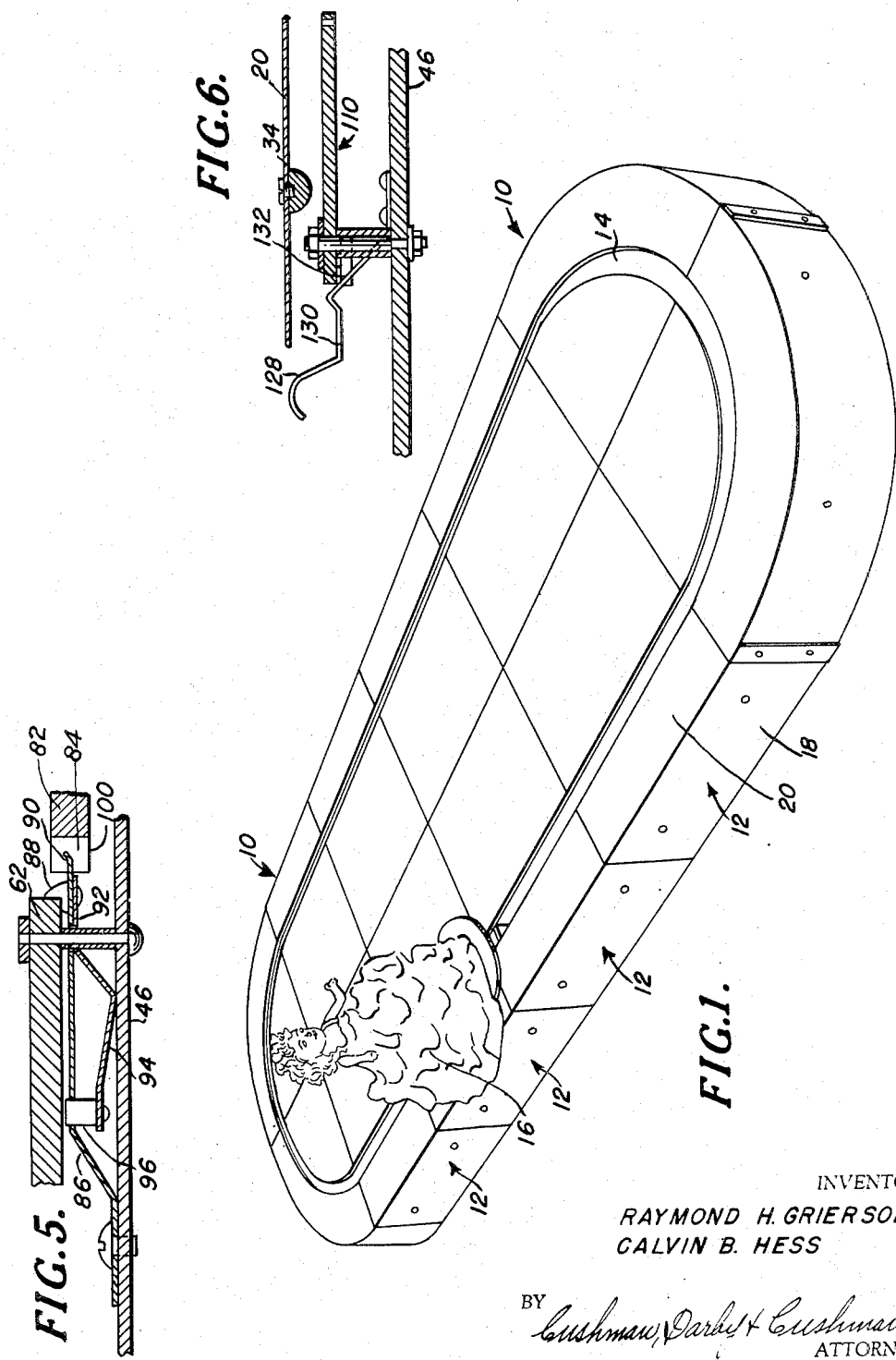
Figure 1 is an overall perspective view of the display assembly.

Referring to Figure 1 there is illustrated a display assembly adapted to be utilized in commercial and educational displays. An assembled base, generally indicated at 10, is made up of a large number of interchangeable and interfitting sections, generally indicated at 12, which are juxtaposed and attached together to form an extended display path. As shown in Figure 1, this path is defined by the continuous slot 14 which is provided in the top of each of the base sections 12. While the assembled base is here illustrated as defining an elongated oval, it is within the contemplation of this invention that the interchangeable and interfitting base sections may be assembled to form a path of any desired shape or length.

Disposed above the surface of the base section is a display device 16, here arbitrarily illustrated as a mannequin or doll, although it is clearly within the contemplation of this invention that any of an infinite variety of attractive and interesting display devices or objects may be freely substituted for the mannequin here shown. As will be described in detail hereinbelow, it is within the contemplation of this invention that the mannequin should be provided with means for imparting one or more operating motions to its various elements such as, for example, motions or movements of the head, torso, or limbs.

Figure 2:
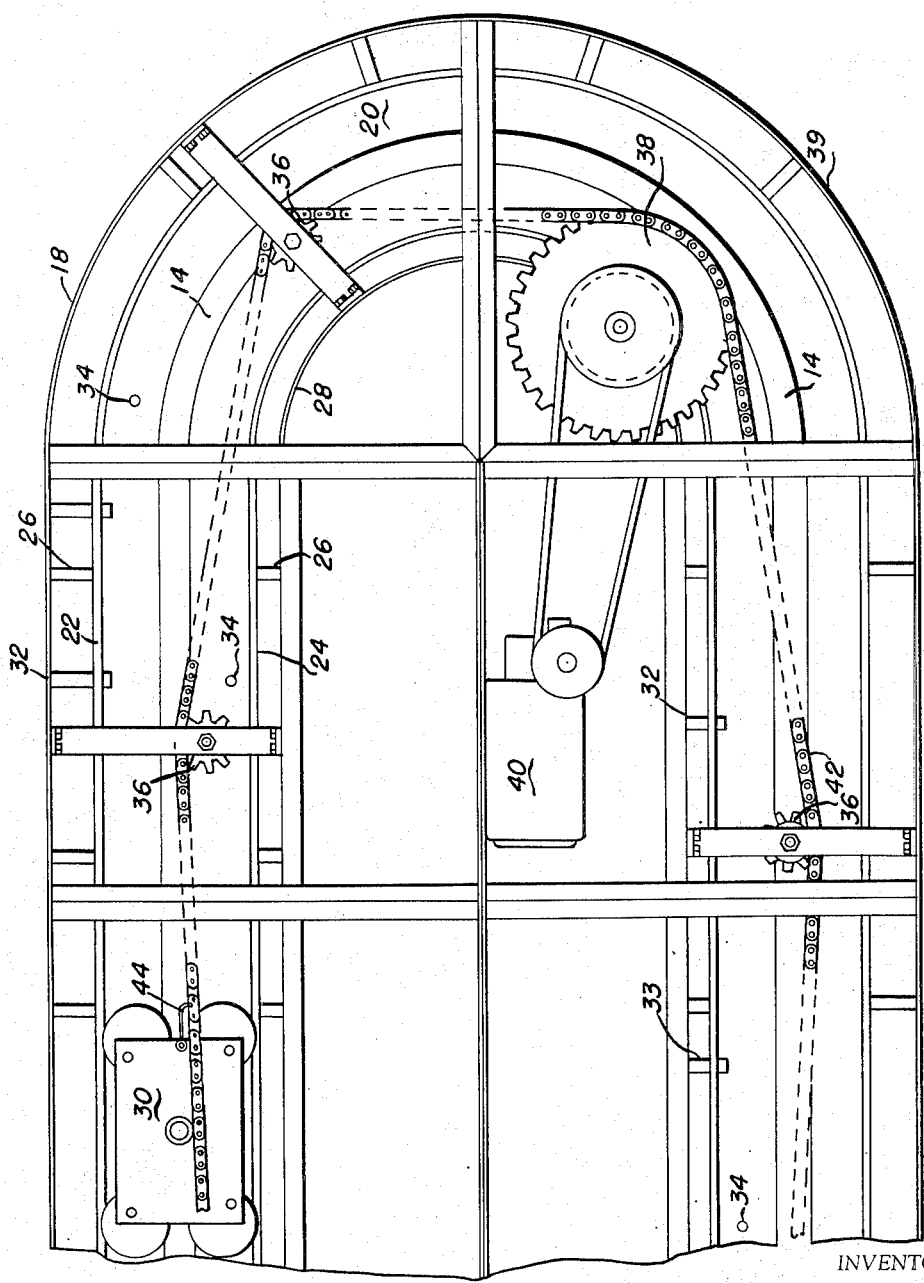
Figure 2 is a bottom plan view of the display assembly.

Referring more particularly to Figures 1 and 2, it will be seen that the base sections 12 may be constructed of box-like metal sections having side walls 18 and a cover wall 20. Each section has a horizontally disposed trackway formed of parallel rails 22 and 24 disposed in horizontally spaced relationship. These rails may be horizontally supported by beams 26 cantilevered from the side walls 18 and from intermediate vertical walls 28. The horizontal suspension of the rails 22 and 24 makes them particularly adapted for supporting, and forming a path for, a carriage having vertically disposed wheels located between, and in the plane of, the parallel rail sections. A carriage, generally indicated at 30, is rollingly disposed between the rails of the trackway in such a manner. The cover wall 20 of each base section 12 is formed with an elongated opening or slot 14 which is congruent with the path defined by the trackway of that base section.

Extending from either the side walls or the intermediate vertical walls are abutment pins 32, which are located on a plane parallel to, but spaced from, the plane defined by the trackway. The side walls and the intermediate vertical walls also carry abutment pins 33, which are located on a plane parallel to, but spaced above, the plane of abutment pins 32. The under-side of the cover wall 20 may be also provided with depending abutment projections 34. These abutments are all located along paths defined by the trackway. The functional utility of all of the abutments discussed hereinabove will be developed in detail hereinafter.

The base sections 12 are each provided with adjustably positioned sprocket idlers 36 vertically disposed below the trackway. One base section has a power driven sprocket 38 co-planar with the idlers 36. This section 39, or a neighboring section, may be provided with any suitable source of motive power, such as a low-speed, or geared-down, electric motor 40, mechanically engaged with the sprocket.

An endless flexible conveyor, such as sprocket chain 42, is suitably threaded over the idler sprockets 36 and the power sprocket 38, and one link or portion of this flexible conveyor is connected with or engaged to the carriage 30, as by wire hook 44.

Figure 3:
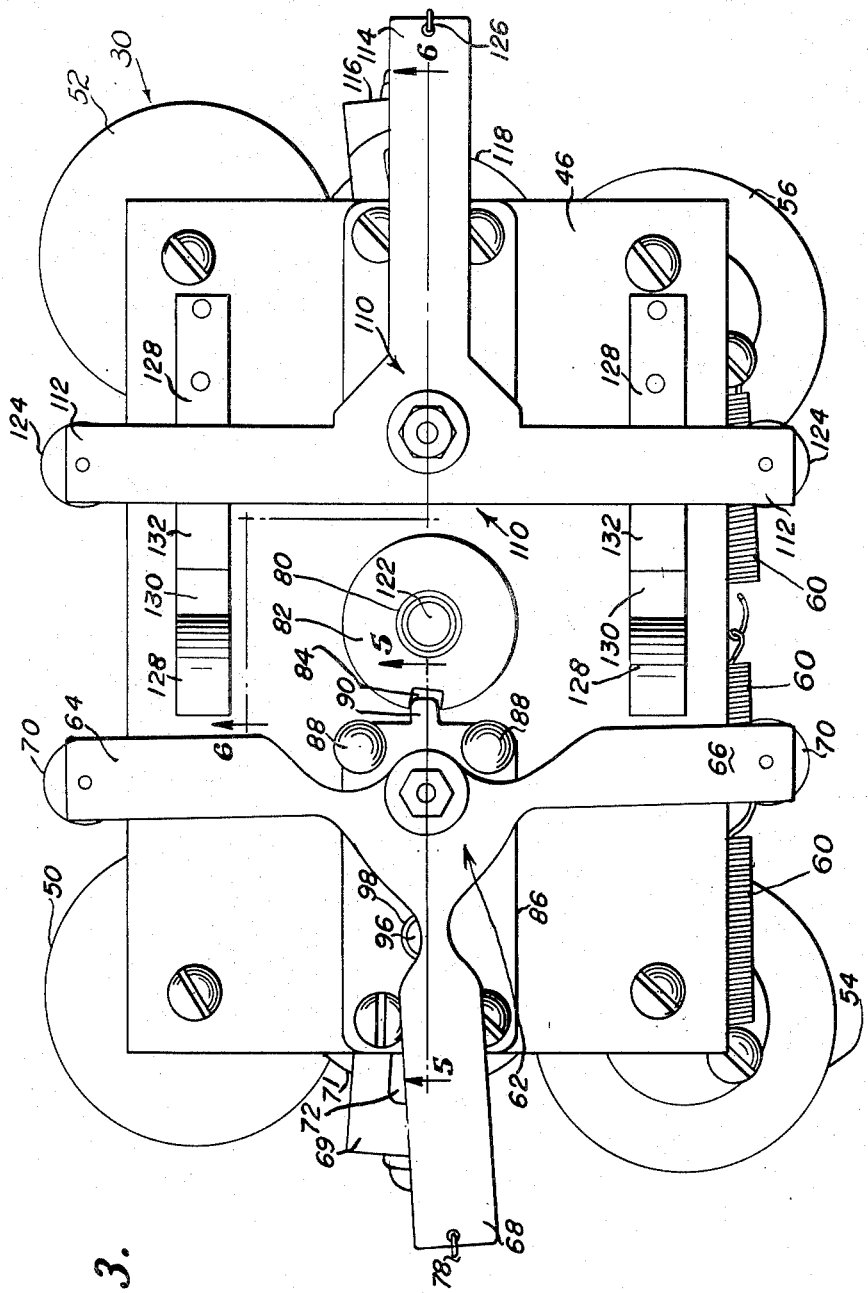
Figure 3 is a top plan view of a carriage adapted to be used in the display assembly in accordance with this invention.
Figure 4:
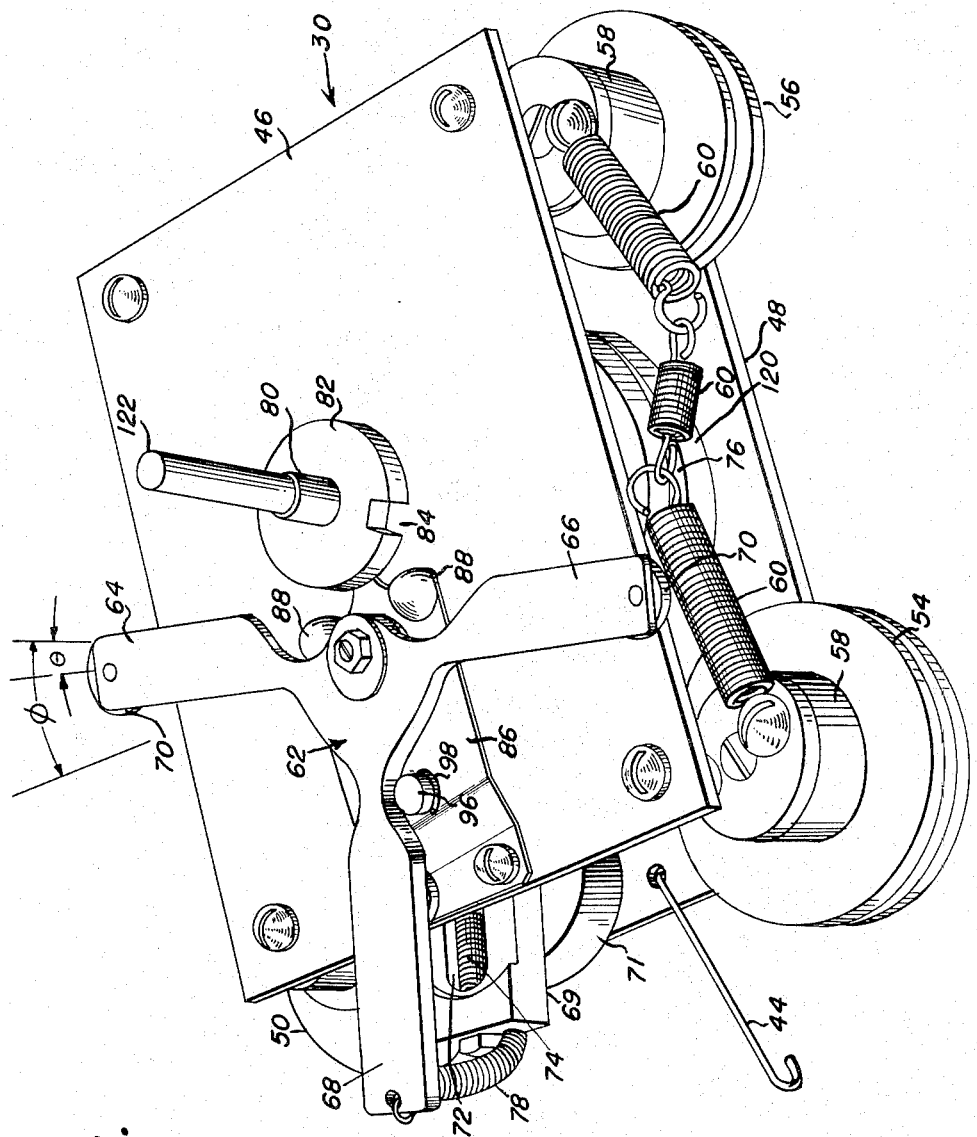
Figure 4 is a perspective view of the carriage illustrated in Figure 3, with one operating arm disposed in a transposed position, and the other operating arm omitted for clarity and convenience.

Referring more particularly to Figures 3 and 4, the carriage may be formed of two spaced planar body members 46 and 48, and may have four vertically disposed grooved wheels, two of which 50 and 52, are pivotally fixed between the body members 46 and 48, and two 54 and 56, of which are pivotally fixed to bearing elements 58 which are, in turn, eccentrically pivotally mounted on the body members 46 and 48. The last mentioned wheels are yieldingly urged towards each other by tension springs 60, which tend to move the bearing elements 58 about their eccentric axes, and thus the springs will yieldingly force the wheels into a firm contact with the rails 22 and 24 and will thereby hold the carriage firmly upon its track while allowing the ready removal therefrom when desired.

Pivotally disposed upon the upper planar body member is a T-shaped operating member 62 having transversely extending arms 64 and 66, and a longitudinally extending stem 68. The operating member is pivoted at the intersection of the arms and stem, that is to say, at the mid point of the arms. The free end of each of the arms has a contact roller 70 pivoted thereto. These rollers are disposed on the same plane as the abutments 32 when the carriage 30 is operatively positioned on the trackway. The length of the arms 64 and 66 and of the abutments 32, are such that the arm will engage the abutments and will be angularly transposed thereby when the carriage is moved past the position of such abutments.

Pivotally disposed between the planar body members 46 and 48, is a boom 69 which is normally positioned to extend longitudinally of the carriage. The boom carries a vertically pivoted idler wheel 71 so positioned that it is brought into peripheral engagement with a carriage wheel 50 when the boom is swung to one side, as shown in Figure 4. The boom 69 is formed with a longitudinally extending slot 72 and the idler wheel 71 is mounted on a collared axle (not shown) slidably disposed in this slot. A compression spring 74 urges the axle, and hence the idler wheel 71, towards a driving wheel 76. The free end of the boom 69 and the free end of the stem 68 are joined by a tension spring 78, which is so dimensioned that it is constantly under some degree of tension despite the relative positions of the boom and stem.

The carriage carries a vertically disposed hollow shaft 80 extending through the top planar body member 46 for projection through the slot 14 and having the driving wheel 76 fixed coaxially thereto. The driving wheel 76 is so dimensioned that it constantly maintains a peripheral contact with the idler wheel 71, which is urged thereagainst by compression spring 74. The hollow shaft is provided with a suitable bearing surface (not shown), at the point where it passes through the upper planar body member 46 and is also provided with a suitable footing bearing (not shown). Adjacent its upper end, the hollow shaft 80 carries an integral collar 82 which is disposed a short distance above the top surface of the upper planar body member 46. The periphery of the collar 82 is provided with a radially extending notch 84 having a depth of substantial size.

Referring more particularly to Figure 5, it will be seen that the operating member 62 is in spaced relation to the top surface of the upper planar body member 46 and that a resilient cantilevered plate 86 is secured to this surface and offset therefrom to extend parallel thereto. This plate extends under the stem 68 and past the arms 64 and 66 and its free end carries two raised contact nubs 88, one adjacent each of the arms of the operating member when the latter is in a neutral position, as shown in Figure 3. The nubs are so dimensioned that the angular transposition of the operating member 68 through angle ϕ will bring one of the arms into contact with one of the nubs and will then depress the nub, together with the resilient plate 86. The free end of the plate is also provided with a tit 90 which extends to a point within the periphery of the collar 82. The tit has such a size and shape that it can fit within the notch 84 when it is in registry therewith and it normally rests within this notch. However, the depression of the spring plate 86, through the depression of the nubs 88 by the arms, 64 or 66, will lower it to a position where it is clear of the undersurface of collar 82.

Referring to Figures 3, 4, and 5, the free end of the spring plate 86 has one end 92 of a spring lever 94 fixed thereto. This lever is mid-fulcrumed on the top surface of the upper body planar element 46, and carries an upstanding detent pin 96 on its free end. The upstanding pin has such a length that it extends upwardly through a suitably located aperture 98 in the plate 86, which aperture is directly under the stem 68 of the operating member 62 when the latter is in the neutral position illustrated in Figure 3. When the spring lever is in its normal, or relaxed position, as shown in Figures 3 and 5, the top of the pin is disposed just below the underside of the stem. When the nubs 88 are depressed, together with the free end of the spring plate 86, the fixed end 92 of the spring lever 94 is also depressed, and this, by means of the fulcrum point, resiliently raises the pin 96. As stated above, the nubs are only depressed when the operating member 62 is angularly transposed, and the stem 68 has such a transverse dimension that this transposition will clear it from the course of the upward movement of the pin.

This embodiment of the carriage operates as follows: When the carriage is moved to a position defined by any abutment 32, the contact roller 70 engages the abutment, and the relative movement of these elements causes the operating arm 64 to be angularly transposed through angle ϕ. This brings the arm 64 to bear against, and then depress, the nub 88, together with the spring plate 86 and the tit 90. The depression of the spring plate serves, by means of fulcrumed spring lever 94, to raise the pin 96 through aperture 98 to a position adjacent the side of the stem 68 which is, together with the rest of the operating member 62, angularly transposed from its neutral position. This transposition of the stem 68 increases the tension of the spring 78, which serves to swing the boom 69, together with the idler wheel 71, pivotally suspended therefrom, into a transposed position in which the idler wheel peripherally engages the carriage wheel 50. As the idler wheel 71 is always held into firm contact with the driving wheel 76, by the action of the compression spring 74, the idler wheel is thereby peripherally engaged with, and serves as a mechanical link between, the carriage wheel 50 and the driving wheel 76. As the carriage 30 continues to move along the track, the rotation of the carriage wheel 50 is transmitted to the driving wheel and therefor to the hollow shaft 80 and collar 82.

As the carriage 30, and the contact roller 70, move past the abutment 32, the operating member 62, under the urging of camming nub 88, will tend to move toward the neutral position, but can only move through small angle θ as the stem 68 will then come to rest against detent pin 96. When the carriage has moved to such a position, it will be readily seen that the collar will have rotated until the angular position of the notch 84 is no longer in registry with the tit 90. The tit is, therefore, held in a depressed position by the lower planar surface 100 of the collar 82. This depressed retention of the tit 90 holds the spring plate 86 down, and thus holds the pin 96 in its elevated position. The last mentioned element effectively prevents the further neutralizing angular motion of the stem 68, and thus of the entire operating member 62. The operating member therefore remains in its angularly transposed position with the idler wheel 71 held firmly in peripheral engagement with the carriage wheel 50 and driving wheel 76. The shaft 80, together with the collar 82, will continue to rotate as the carriage moves along the trackway, but when the shaft and collar have rotated through an entire revolution, the notch 84 returns to its original position, that is, in registry with the tit 90. The spring plate 86 will thereupon move the tit 90 up into the notch and at the same depress the pin 96 so that the nub 88 will cam the arm 64, and the stem 68, to their neutral positions. Hence, the idler 71 is moved from engagement with the wheel 50. Thus, the direct mechanical drive between the carriage wheel 50 and the shaft 80 is broken and there will be no operative force seeking to rotate the collar 82 against the retaining action of the tit 90 in the notch 84, even though the carriage continues to roll along the trackway.

It is within the contemplation of this invention that the collar may be provided with more than one notch so that the shaft 80 will only rotate through a limited arc before being retarded and disengaged from the carriage wheel. It will be readily seen that the shaft may be induced to rotate in either direction, depending upon which side of the trackway is provided with an abutment pin 32. It will therefore follow that if the collar is provided with one or more notches, and if the trackway is provided with abutments 32, on either side thereof, in a suitable pre-selected arrangement, the shaft 80, and any display device borne thereby, will oscillate and intermittently rotate or perform any combination of these movements, as desired.

Referring more particularly to Figures 3, and 6, there is shown a modification of the detent means for retaining an operating member in a transposed position, that is, to hold a boom in such a position that an idler wheel is firmly engaged with a carriage wheel and a driving wheel.

A second operating member 110, formed with arms 112 and stem 114, and pivoted to the body of the carriage at the intersection of these elements, is disposed above the top surface of the upper planar body member 46. A boom 116, pivotally suspended between the upper and lower planar body members, extends from a second longitudinal end of the carriage and carries an idler 118 in the manner discussed above. The idler 118 is arranged to engage one of the carriage wheels 52, 56, and a driving wheel 120 which is coaxial with, and fixed to, solid shaft 122, which extends through the lumen of hollow shaft 80. The thickness of the idler 71, the idler 118, the driving wheel 76, and the driving wheel 120 are each so proportioned that there is no engagement between the two sets of wheel elements, for example, between idler 71 and driving wheel 120. The operating member 110 defines a plane parallel with that defined by operating member 62, but in spaced relation to it and preferably above it. In any event, the contact rollers 124 on the free ends of the arms 112 are coplanar with abutments 33 and the arms and abutments have such a length that they will become engaged when the carriage moves past one of these abutments. When this occurs, the arm 112 is angularly transposed by the relative movement of the cariage and the abutment, and the boom is resiliently carried, by the tension spring 126, into a position bringing the idler 118 into peripheral engagement with the carriage wheel.

As shown in Figure 6, the top surface of the upper planar body member 46 is provided with a cantilevered spring arm 128 which is formed with a depression or pocket 130 at a distance from the fixed end thereof. As the arm 112 is angularly moved from its neutral position, it will travel along the normally inclined surface 132 of the spring arm until it is in a position in registry with the pocket. The spring arm will then resiliently snap upward to confine a section of the arm and thus retain the entire arm and hold the operating member in its transposed position. The shaft 122 will thus continue to be engaged, through driving wheel 120 and idler 118, with the carriage wheel and will therefore rotate as the carriage is moved along the trackway.

The free end of the spring arm 128 extends upward to a position closely adjacent the under surface of the cover 20. The under surface has one or more depending nubs or abutments 34 located above the trackway and positioned in the path of the free end of the spring arm 128. The nub 34 is of such a size that when this free end rides over its surface, the pocket 130 will be depressed sufficiently to release the section of the operating member arm 112 which had previously been retained thereby. Upon the release of the arm, the entire operating member is moved, by the camming action of the inclined surface 132 of the spring arm, towards its neutral position and thus the mechanical drive between the moving carriage wheel and the shaft 122 is broken.

It will be readily seen that the trackway may be provided with one or more arm-transposing abutments 33, as well as with one or more arm-releasing depending nubs 34 and that the carriage may have one spring arm 128 for each cross arm 112 of the operating member.

This embodiment of the detent means, may be arranged so that the shaft 122 will rotate through one revolution or through several revolutions, as desired. It will be readily seen that if the abutment 33 is located on a first side of a trackway, the shaft 122 will rotate in a first direction, while the location of the abutment on a second and opposite side of the trackway will result in a directionally opposite rotation of the shaft.

It is within the contemplation of this invention that any of an infinite variety of display devices may be carried by the shafts 80 and 122, and that they may utilize the respective motions of the shafts in any manner to provide attractive and interesting display spectacles.

Having described only a typical preferred form and application of our invention, we do not wish to be limited or restricted to specific details herein set forth but wish to reserve to ourselves any variations or modifications that may appear to those skilled in the art and falling within the scope of the following claims.

We claim:

1. In a display device having a trackway and a carriage movable therealong, the combination comprising: a rotatable shaft on the carriage for effecting movement of a display carried thereby; a fixed abutment located along the trackway; an arm movably mounted on the carriage in position to be engaged and moved by said fixed abutment as the carriage travels along the trackway; means controlled by said arm and operated by relative movement between the trackway and the carriage for effecting a continuing rotation of said shaft as said carriage moves along the trackway, and means operated by relative movement between the trackway and the carriage for terminating the rotation of said shaft.

2. A display device comprising: a trackway; a carriage movable therealong; a rotatable shaft on said carriage for effecting movement of a display carried thereby; a fixed abutment located along said trackway; an arm movably mounted on said carriage in position to be engaged and moved by said fixed abutment from an inoperative to an operative position as said carriage travels along said trackway; means biasing said arm to said inoperative position; means mounted on said carriage, controlled by the movement of said arm, and operated by movement of said carriage along said trackway for effecting rotation of said shaft; detent means for retaining said arm in said operative position to effect rotation of the shaft; and means operated by the movement of said carriage through a predetermined distance on said trackway for releasing said detent means to thereby terminate the rotation of said shaft.

3. The display device defined in claim 2 in which the detent means comprises: a resilient member extending generally transversely of the arm and formed to receive and retain a section thereof.

4. The structure defined in claim 2 in which the detent releasing means is mounted on the shaft and operable by a predetermined extent of rotation thereof.

5. The structure defined in claim 2 in which the detent releasing means is mounted on the trackway.

6. A display device comprising: an endless trackway; a carriage movable therealong; a wheel on said carriage rollingly engaging said trackway; a fixed abutment located along said trackway; a movable arm disposed on said carriage to engage and be angularly moved by said abutment from an inoperative to an operative position; a display motivating shaft rotatably disposed on said carriage; an idler wheel; means operated by movement of said arm to said operative position for moving said idler wheel into driven engagement with said carriage wheel and driving engagement with said shaft, whereby said shaft is rotated by movement of said carriage along said trackway; and means for retaining said arm in said operative position during travel of said carriage for a predetermined distance along said trackway.

7. The display device defined in claim 6 in which the retaining means includes a resilient member engageable and movable by the arm; detent means operable by movement of said member for engaging and retaining said arm in its operative position, a notched collar on the shaft, and a projection on said member engaged within a notch on said collar when said arm is in an inoperative position.

8. The display device defined in claim 6 in which the retaining means includes a resilient member engageable by the arm to retain the latter in its said operative position and a second fixed abutment located along the trackway in position to engage and move said member to release said arm.

References Cited in the file of this patent

UNITED STATES PATENTS

| | | |
|---|---|---|
| 2,106,335 | Allen | Jan. 25, 1938 |
| 2,290,844 | Smith | July 21, 1942 |
| 2,486,273 | Gibson | Oct. 25, 1949 |